(12) United States Patent
Singh et al.

(10) Patent No.: US 11,822,352 B2
(45) Date of Patent: Nov. 21, 2023

(54) ENGINE OUT GO AROUND VERTICAL CLEARANCE SYSTEM AND METHOD

(71) Applicant: Rockwell Collins, Inc., Cedar Rapids, IA (US)

(72) Inventors: Jaibir Singh, Bangalore (IN); Shankar Ganesh Narayanasamy Sadasivam, Bangalore (IN); Harish H S, Bangalore (IN)

(73) Assignee: Rockwell Collins, Inc., Cedar Rapids, IA (US)

( * ) Notice: Subject to any disclaimer, the term of this patent is extended or adjusted under 35 U.S.C. 154(b) by 270 days.

(21) Appl. No.: 17/317,146

(22) Filed: May 11, 2021

(65) Prior Publication Data

US 2022/0129016 A1 Apr. 28, 2022

(30) Foreign Application Priority Data

Oct. 26, 2020 (IN) .............................. 202041046641

(51) Int. Cl.
*G05D 1/10* (2006.01)
*B64F 5/60* (2017.01)
(Continued)

(52) U.S. Cl.
CPC ............. *G05D 1/106* (2019.05); *B64D 43/00* (2013.01); *B64F 5/60* (2017.01); *G08G 5/0013* (2013.01); *G08G 5/0039* (2013.01)

(58) Field of Classification Search
CPC ........... B64D 31/06; B64D 43/00; B64F 5/60; G05D 1/106; G05D 1/0676; G08G 5/0013;
(Continued)

(56) References Cited

U.S. PATENT DOCUMENTS

| 3,691,356 A | 9/1972 | Miller |
| 4,326,253 A | 4/1982 | Cooper et al. |

(Continued)

FOREIGN PATENT DOCUMENTS

| EP | 0037159 B1 | 5/1985 |
| WO | 2017173416 A1 | 10/2017 |

OTHER PUBLICATIONS

Extended Search Report in European Application No. 21204044.8 dated Apr. 7, 2022, 6 pages.

(Continued)

*Primary Examiner* — Christian Chace
*Assistant Examiner* — Nicholas Stryker
(74) *Attorney, Agent, or Firm* — Suiter Swantz pc llo (57) ABSTRACT

A system and method onboard an aircraft generates pilot awareness of obstacle clearance during an engine out (EO) go around (GA) situation. The system herein receives inputs from either a pilot selection or aircraft state change indicating a GA below a published missed approach altitude and also receives an input from an engine status monitor indicating an EO situation. As a GA below the published missed approach altitude does not ensure obstacle clearance with an EO, the systems herein generate a pseudo engine out go around procedure (PEOGAP) which calculates a minimum climb gradient maintaining a minimum separation from all obstacles within an area bound by the published missed approach. Once generated, the systems herein display the PEOGAP to the pilot for adequate obstacle separation and pilot awareness.

14 Claims, 8 Drawing Sheets

(51) Int. Cl.
*B64D 43/00* (2006.01)
*G08G 5/00* (2006.01)

(58) Field of Classification Search
CPC .. G08G 5/0039; G08G 5/0056; G08G 5/0086; G08G 5/025; G08G 5/045
See application file for complete search history.

(56) References Cited

U.S. PATENT DOCUMENTS

| | | | |
|---|---|---|---|
| 5,646,784 A * | 7/1997 | Wilson | A42B 3/042 359/14 |
| 6,437,707 B1 | 8/2002 | Johnson | |
| 6,643,580 B1 * | 11/2003 | Naimer | G08G 5/0034 340/963 |
| 7,302,318 B2 * | 11/2007 | Gerrity | G08G 5/0086 701/16 |
| 7,765,036 B2 | 7/2010 | Bouchet | |
| 8,560,150 B1 * | 10/2013 | Phillips | B64D 45/08 701/16 |
| 9,368,036 B2 | 6/2016 | Coulmeau et al. | |
| 10,026,327 B2 | 7/2018 | Prenot et al. | |
| 2004/0107027 A1 * | 6/2004 | Boudrieau | B64D 45/0015 701/1 |
| 2006/0253232 A1 | 11/2006 | Gerrity et al. | |
| 2009/0030564 A1 * | 1/2009 | Peterson | G08G 5/025 701/3 |
| 2014/0343765 A1 * | 11/2014 | Suiter | G08G 5/0091 701/18 |
| 2016/0378302 A1 * | 12/2016 | Gilger | G06F 3/0482 715/736 |
| 2020/0168104 A1 | 5/2020 | Holder et al. | |

OTHER PUBLICATIONS

FAA-H-8083-16B: Instrument Procedures Handbook, Chapter 4, URL:https://www.faa.gov/regulations_policies/handbooks_manuals/aviation/instrument_procedures_handbook/media/FAA-H-8083-16B_Chapter_4.pdf, downloaded Sep. 3, 2020, 92 pages.

* cited by examiner

ENGINE OUT GO AROUND VERTICAL
CLEARANCE SYSTEM AND METHOD

CROSS-REFERENCE TO RELATED
APPLICATIONS

The present application claims the benefit under 35 U.S.C. § 119 and/or 120 of India Provisional Application No. 202041046641 filed on 26 Oct. 2020, the contents of which above-named Application is herein incorporated by reference in its entirety.

BACKGROUND

A go around (GA) or missed approach (MA) maneuver may be challenging as pilots may infrequently fly and practice these maneuvers. Normally a GA requires a power addition, a transition from a descent to a climb, and a level off at lower than normal altitude. Often, a GA may come as a surprise to the pilots as they are planning to land the aircraft when the air traffic control (ATC) may verbally direct the pilots to discontinue the landing.

Adding to the challenge, a loss of an engine during this already challenging maneuver may task saturate the pilots beyond their current capability. As a distraction from an engine out (EO) may require immediate action procedures, this event coupled with a GA maneuver may present additional problems for the flight crew.

At present during a GA maneuver, the pilot is required to fly either a published missed approach procedure or as advised by ATC. In the event of the engine failure during missed approach from a published missed approach point, each aircraft is certified to be capable of safely flying the published missed approach procedure. Should the aircraft be directed to execute the GA below the published missed approach altitude, there may be questions in the minds of the pilots whether required obstacle clearance (ROC) may be met.

Missed approach procedures may be generally divided into initial, intermediate and final phases. Statutory minimum obstacle clearance requirements begin in the intermediate phase with a 30-meter (98 feet) clearance requirement. In the final phase, the obstacle clearance requirement becomes 50 meters (164 feet). The nominal climb gradient of a missed approach vertical path is 2.5%. For older aircraft, particularly piston engine powered aircraft, compliance with the published missed approach may not be achievable when operating at or near the maximum certificated weight, at high altitudes, with high temperatures and an EO condition.

Therefore, a need remains for a system and related method which may overcome these limitations and provide a novel solution to establish a minimum climb gradient requirement to remain clear of all obstacles during an EO GA.

SUMMARY

In one embodiment of the inventive concepts disclosed herein, a system onboard an aircraft for engine out (EO) go around (GA) obstacle clearance may comprise a GA selection monitor configured for sensing a pilot section of a GA and an aircraft state monitor configured for monitoring an aircraft state. The system may also include an engine status monitor configured to monitor an engine operating status or an EO status of an engine coupled with the aircraft and a flight deck display available to a pilot.

For control, the system may include a controller operatively coupled with each of the GA selection monitor, the aircraft state monitor, the engine status monitor, and the flight deck display and a tangible, non-transitory memory configured to communicate with the controller, the tangible, non-transitory memory including a performance database (DB), a navigation DB, and a terrain DB, the tangible, non-transitory memory having instructions stored therein that, in response to execution by the controller, cause the controller to carry out each function of the system.

The system may function to retrieve, from the navigation DB, a published approach flown by the aircraft, the published approach including a published missed approach point (MAPt), a MAPt altitude mean sea level (MSL), and a published missed approach procedure (MAP) and receive, from one of: the GA selection monitor or the aircraft state monitor, a GA status of the aircraft. The system may also receive, from the engine status monitor, the EO status of the engine and retrieve, from the aircraft state monitor, 1) a GA altitude MSL of the aircraft at the GA status, the GA altitude defined as being below the MAPt altitude and 2) a GA point associated with the GA status.

The system may further retrieve, from the terrain DB, an obstacle within an area bound by the MAP and retrieve, from the performance DB, an aircraft performance data associated with the aircraft including a takeoff safety (V2) speed of the aircraft, at the GA status.

For obstacle clearance, the system may generate a pseudo engine out go around procedure (PEOGAP) for the aircraft based on the aircraft performance data at the V2 speed, the PEOGAP including a first vertical path from the GA point at the GA altitude to a first obstacle clearance point, the first obstacle clearance point a first height MSL of a first obstacle of the obstacle plus a fixed clearance plus a safety margin, a second vertical path from the first obstacle clearance point to a second obstacle clearance point, the second obstacle clearance point a second height MSL of a second obstacle of the obstacle plus the fixed clearance plus the safety margin, and a third vertical path from the second obstacle clearance point to an anticipation point, the anticipation point having an anticipation altitude which intersects a vertical path within a final portion of the published MAP. The system may then display the PEOGAP to the pilot on the flight deck display.

An additional embodiment of the inventive concepts disclosed herein may include a method for engine out (EO) go around (GA) obstacle clearance. The method may include retrieving, from a navigation database (DB), a published approach flown by an aircraft, the published approach including a published missed approach point (MAPt), a MAPt altitude mean sea level (MSL), and a published missed approach procedure (MAP), and receiving, from one of: a GA selection monitor or an aircraft state monitor, a GA status of the aircraft.

The method may also include receiving, from an engine status monitor, an EO status of an engine coupled with the aircraft and retrieving, from the aircraft state monitor, 1) a GA altitude MSL of the aircraft at the GA status, the GA altitude defined as being below the MAPt altitude and 2) a GA point associated with the GA status.

The method may further include retrieving, from a terrain DB, an obstacle within an area bound by the MAP and retrieving, from a performance DB, an aircraft performance data associated with the aircraft including a takeoff safety (V2) speed of the aircraft, at the GA status. For obstacle clearance, the method may include generating a pseudo engine out go around procedure (PEOGAP) for the aircraft based on the aircraft performance data at the V2 speed, the PEOGAP including, a first vertical path from the GA point at the GA altitude to a first obstacle clearance point, the first obstacle clearance point having a first height MSL of a first obstacle of the obstacle plus a fixed clearance plus a safety margin, a second vertical path from the first obstacle clearance point to a second obstacle clearance point, the second obstacle clearance point having a second height MSL of a second obstacle of the obstacle plus the fixed clearance plus the safety margin, and a third vertical path from the second obstacle clearance point to an anticipation point, the anticipation point having an anticipation altitude which intersects a vertical path within a final portion of the published MAP. The method may then include displaying the PEOGAP to a pilot on a flight deck display.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which.

DETAILED DESCRIPTION OF EXEMPLARY EMBODIMENTS

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

As used herein, the term "approximately" may refer to a range of values including plus or minus twenty percent (20%) of the listed value. For example, approximately 50 would equal a range of +/−20% of 50 which may include a range from 40 to 60.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method onboard an aircraft generates pilot awareness of obstacle clearance during an engine out (EO) go around (GA) situation. The system herein receives inputs from either a pilot selection or aircraft state change indicating a GA below a published missed approach altitude and also receives an input from an engine status monitor indicating an EO situation. As a GA below the published missed approach altitude does not ensure obstacle clearance with an EO, the systems herein generate a pseudo engine out go around procedure (PEOGAP) which maintains a minimum separation from all obstacles within an area bound by the published missed approach. Once generated, the systems herein display the PEOGAP to the pilot for adequate terrain separation and pilot awareness.

| | |
|---|---|
| 100 | System Diagram |
| 110 | Controller |
| 120 | Memory |
| 122 | Performance TOLD DB |
| 124 | Navigation DB |
| 126 | Terrain DB |
| 130 | TOGA Select Monitor |
| 132 | Aircraft State Monitor |
| 140 | Engine Status Monitor |
| 150 | Flight Deck Display |
| 152 | Autopilot |
| 154 | Flight Director |
| 156 | Auto Throttle |
| 160 | Datalink |
| 200 | Logic Flow Diagram |
| 210 | EOGA Vertical Path Generator |
| 212 | Speed Generator |
| 214 | Climb Gradients Generator |
| 216 | EO Vertical Path |
| 218 | Flight Director and Auto Thrust Command Generator |
| 230 | TOGA Engagement |
| 232 | Manual Rotation |
| 234 | GA Initiation |
| 240 | Engine Out (EO) Detection |
| 250 | Display Symbology |
| 252 | Autopilot Command |
| 254 | Flight Director Command |
| 256 | Autothrottle Command |
| 260 | Transmission External |
| 300 | Vertical Diagram |
| 302 | Obstacle 1 |
| 304 | Obstacle 2 |
| 306 | Final MAP Elevation |
| 308 | Area Bounded by MAP |
| 310 | Pseudo Engine Out Go Around Procedure (PEOGAP) |
| 320 | Go Around Point A |
| 322 | First Obstacle Clearance Point B |
| 324 | Second Obstacle Clearance Point C |
| 326 | Anticipation Point (Ap) |
| 330 | Theta 2 (Θ2) |
| 332 | Theta 1 (Θ1) |
| 334 | Theta 3 (Θ3) |
| 340 | GA Point A Position |
| 342 | Point B Position |
| 344 | Point C Position |
| 346 | Ap Position |
| 350 | Distance A-B |
| 352 | Distance B-C |
| 354 | Distance C-Ap |
| 360 | GA Point A Altitude MSL |
| 362 | Point B Altitude MSL |
| 364 | Point C Altitude MSL |
| 366 | Ap Altitude MSL |
| 380 | Sea Level |
| 382 | Runway Elevation MSL |
| 384 | Runway |
| 390 | Missed Approach Point (MAPt) |
| 392 | Missed Approach Procedure (MAP) |
| 394 | Standard MA climb gradient (CG) |
| 396 | Unknown GA CG |
| 400 | Geometry Example |
| 490 | MAPt Altitude MSL |
| 500 | MFD Performance Bar Display |
| 526 | Ap Symbology |
| 536 | Red Bar Negative Performance |
| 546 | Yellow Bar Neutral Performance |
| 556 | Green Bar Positive Performance |
| 566 | Command Bars |
| 600 | MFD Trend Arrow Display |
| 602 | Flight Path Marker |
| 626 | Positive Trend Arrow |
| 628 | Negative Trend Arrow |
| 636 | Guidance Ap Circle |
| 646 | Guidance Bar |
| 700 | Vertical Situation Display |
| 710 | Terrain Symbology |
| 720 | Aircraft Symbology |
| 800 | Method Flow |

REFERENCE CHART

Figure 1:
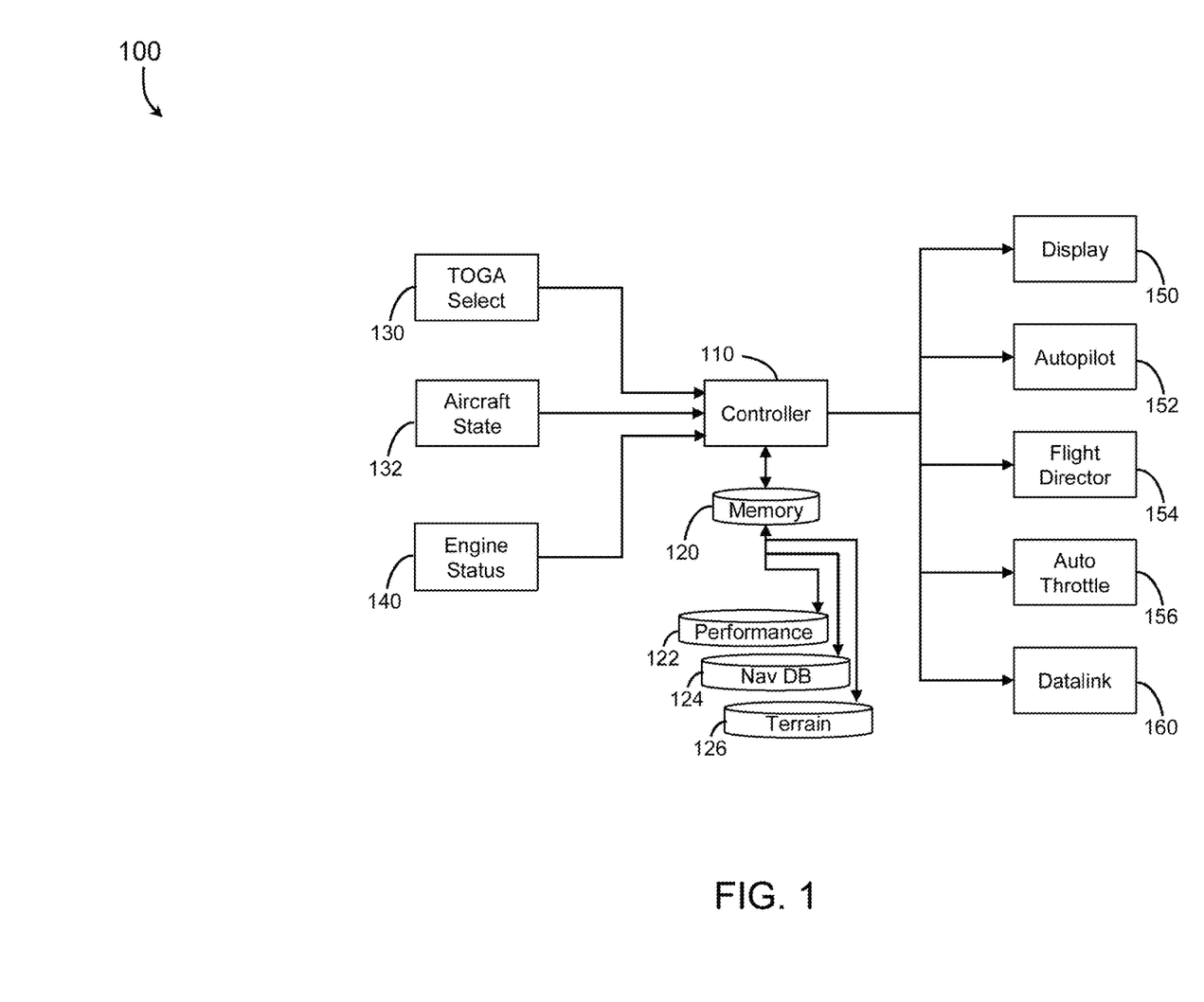
FIG. 1 is a diagram of a system for engine out (EO) go around (GA) obstacle clearance in accordance with an embodiment of the inventive concepts disclosed herein.

FIG. 1

Referring now to FIG. 1, a diagram of a system for engine out (EO) go around (GA) obstacle clearance 100 in accordance with an embodiment of the inventive concepts disclosed herein is shown. Generally, the system for EO GA obstacle clearance 100 may be incorporated onboard an aircraft to enable system function without an external communication requirement or reception of an external signal. Also, the system for EO GA obstacle clearance 100 may provide function to a manned aircraft as well as an unmanned aircraft. In this disclosure, a manned aircraft may be the focus however the inventive concepts disclosed herein may directly apply to an autonomous unmanned aircraft system (UAS) as well.

The system for EO GA obstacle clearance 100 may enable an aircraft during a GA maneuver to fly a lower vertical profile than attempting to rejoin a published missed approach procedure (MAP) vertical profile and safely maintaining a climb gradient in the event of engine failure during the GA. Also, the system may enable safety of the aircraft by flying a lower climb gradient in the event where adherence to a published MAP climb gradient is difficult. This may be due to initiation of GA below a published missed approach point (MAPt) due to various reasons such as canceling a landing clearance, gusting wind or a safety issue with the runway (e.g., men and equipment on the runway, aircraft crossing runway, etc.)

The system for EO GA obstacle clearance 100 may improve safety operations at airports and better traffic management due to predictable vertical profiles. The system may allow predictable spacing between aircraft over parallel runways during simultaneous arrival and departure operations and enable a greater margin of safety at airports by avoiding chances of runway incursion and runway excursion due to continuing a landing during an unstabilized approach.

As used herein, a missed approach (MA) may be defined as an aircraft executing a published missed approach procedure (MAP) from a published missed approach point (MAPt) at the published missed approach altitude. A GA may be defined as a rejected landing where the aircraft discontinues the landing attempt at an altitude below the published missed approach altitude. Of note, a GA may be anywhere below the published missed approach altitude including a few feet below the published missed approach altitude to a few feet above the runway.

System Description

In one embodiment of the inventive concepts disclosed herein, the system for EO GA obstacle clearance 100 may include a GA selection monitor 130 configured for sensing a pilot section of a GA. In this manner, the system for EO GA obstacle clearance 100 may declare a GA status should the pilot select a thrust lever sensor by advancing the thrust levers, a GA push button sensor by the pilot actually pressing a GA button, a takeoff go around (TOGA) sensor incorporated within a throttle control, and a flight management system (FMS) interface incorporated to interact with the FMS when the FMS senses a GA.

For example, one specific aircraft may be fitted with a GA button on each of the throttles. The pilot selection of this GA button may be one trigger for the system for EO GA obstacle clearance 100 to declare a GA status. Alternatively, some aircraft may enter a TOGA mode during an approach phase when the thrust levers are advanced to a specific detent. Here, the system for EO GA obstacle clearance 100 may declare the GA status when the TOGA mode is enabled on the aircraft.

In one embodiment of the inventive concepts disclosed herein, the system for EO GA obstacle clearance 100 may include an aircraft state monitor 132 configured for monitoring at least one aircraft state. Here, inputs to the aircraft state monitor 132 may include the aircraft state of a position via an inertial system or an inertial system updated by a global navigation satellite system (GNSS) or a stand-alone GNSS position input. Also, a pitot static system may provide an altitude MSL, a rate of climb, a rate of descent, and an airspeed. Further, an altitude above ground level (AGL) may be provided by a radio altimeter while a groundspeed, an attitude, a power level of the at least one engine, and a heading may be provided by traditional attitude sensors and engine indication and crew alerting system (EICAS) interface elements.

In one embodiment of the inventive concepts disclosed herein, the system for EO GA obstacle clearance 100 may include an engine status monitor 140 configured to monitor an engine operating status or an EO status of at least one engine coupled with the aircraft. Here, the engine status monitor 140 may be as simple as a binary monitor to sense of the engine is producing power or not. In embodiments, the engine status monitor 140 may further include an engine speed monitor, an engine fuel flow monitor, and an engine condition and monitoring (ECAM) interface.

In one embodiment of the inventive concepts disclosed herein, the system for EO GA obstacle clearance 100 may also include a flight deck display 150 available to a pilot of the aircraft. In some embodiments the flight deck display 150 may further include a multifunction display (MFD), a heads-up display (HUD), and a helmet mounted display (HMD). The flight deck display 150 may further include a vertical situation display indicating a current MSL altitude of the aircraft and a terrain associated with the MAP.

In additional embodiments, the flight deck display 150 may be sited remotely for a remote pilot to monitor the progress of the flight of the aircraft. Here, a datalink 160 may provide a communications link between the aircraft and the remote pilot for the remote pilot may view a remote version of the flight deck display 150 when located distant from the aircraft.

The system for EO GA obstacle clearance 100 may include a controller 110 operatively coupled with each of the GA selection monitor 130, the aircraft state monitor 132, the engine status monitor 140, and the flight deck display 150. Here, the controller 110 may be incorporated within the FMS onboard the aircraft as well as within additional controlling elements of the aircraft systems. For example, a mission computer (MC) may provide function as the controller 110 as well as a flight control computer (FCC).

In one embodiment of the inventive concepts disclosed herein, the system for EO GA obstacle clearance 100 may further include a tangible, non-transitory memory 120 configured to communicate with the controller 110, the tangible, non-transitory memory including a performance takeoff and landing data (TOLD) database (DB) 122, a navigation DB 124 including runway and approach information, and a terrain DB 126. The tangible, non-transitory memory 120 may have instructions stored therein that, in response to execution by the controller, cause the controller to carry out each step of the system for EO GA obstacle clearance 100.

In one embodiment of the inventive concepts disclosed herein, the system for EO GA obstacle clearance 100 may further include an autopilot 152, a flight director 154, and an auto throttle 156 incorporated within a manned aircraft or UAS. Here, the pilot may command the autopilot to control the aircraft or the remote operator may enable the autopilot 152, coupled with the flight director 154 and auto throttle 156, to fly the UAS as directed by the controller 110.

In embodiments, the datalink 160 may provide function as above with the remote operator but also provide a communications link to an air traffic control (ATC) to communicate the EO status and GA status to ATC. Here, the datalink 160 may function within a controller pilot data link communication (CPDLC) onboard the aircraft and auto communicate the status to ATC.

System Function

In one embodiment of the inventive concepts disclosed herein, the controller 110 may function to retrieve, from the navigation DB 124, a published approach currently being flown by the aircraft, the published approach including the MAPt, a MAPt altitude mean sea level (MSL), and a published MAP. As the pilot may select an approach procedure from the navigation DB 124, the controller 110 may also receive this information in preparation for later function.

Figure 3:
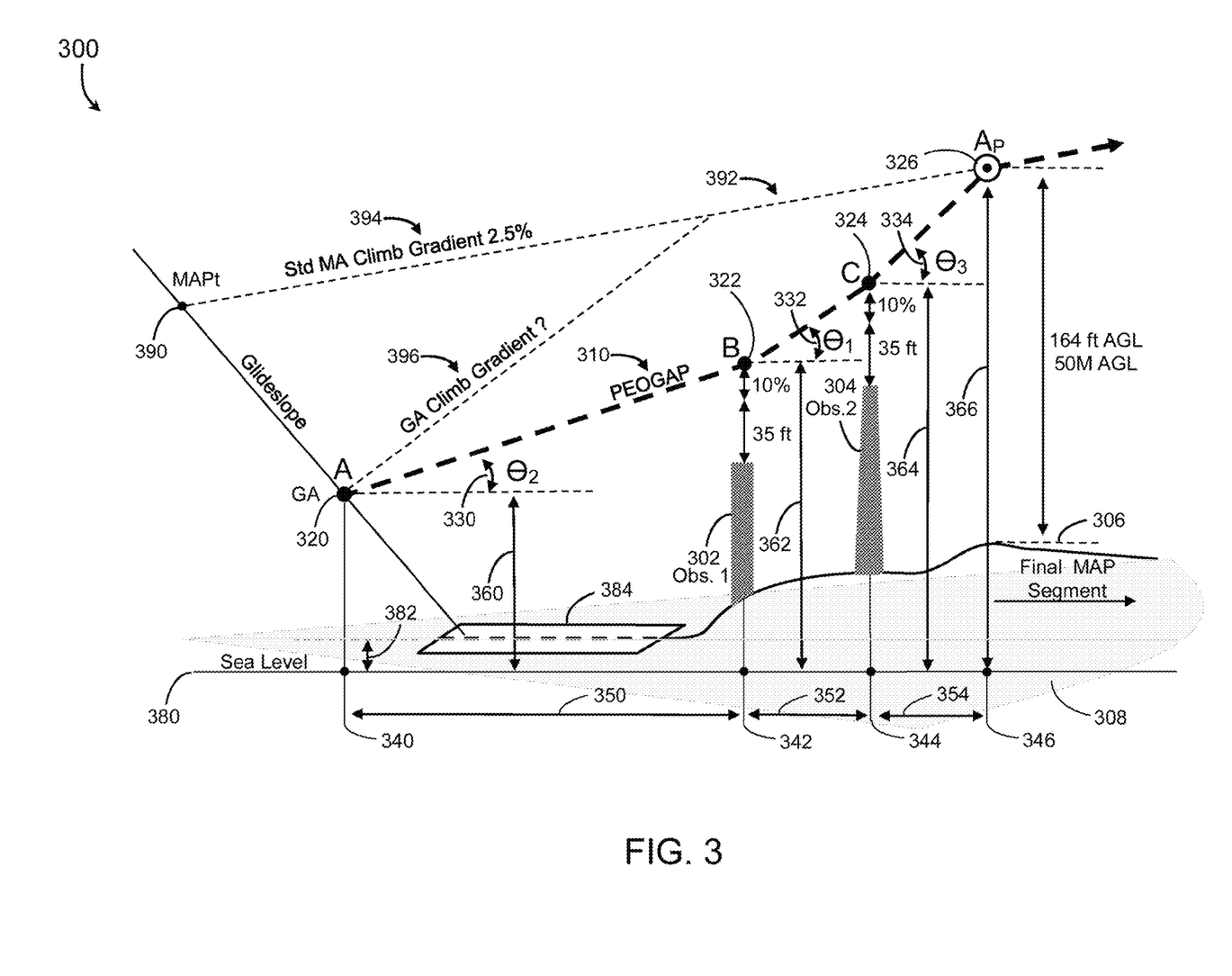
FIG. 3 is a diagram of a vertical path side view exemplary of an embodiment of the inventive concepts disclosed herein.

The published approach procedure may include each of these variables including the published MAP and an area bounded by the MAP 308 (FIG. 3). Normally, the MAP may include an initial segment where the aircraft transitions from a descent to a climb, an intermediate segment where the aircraft climbs to remain clear of obstacles, and a final segment where the aircraft is above all obstacles within the area bounded by the MAP 308. The system for EO GA obstacle clearance 100 may provide function during each of these segments enabling pilot awareness of a minimum fly safe climb gradient (MFSCG) associated with the climb out from GA execution to reaching a safe altitude along the published MAP.

Figure 2:
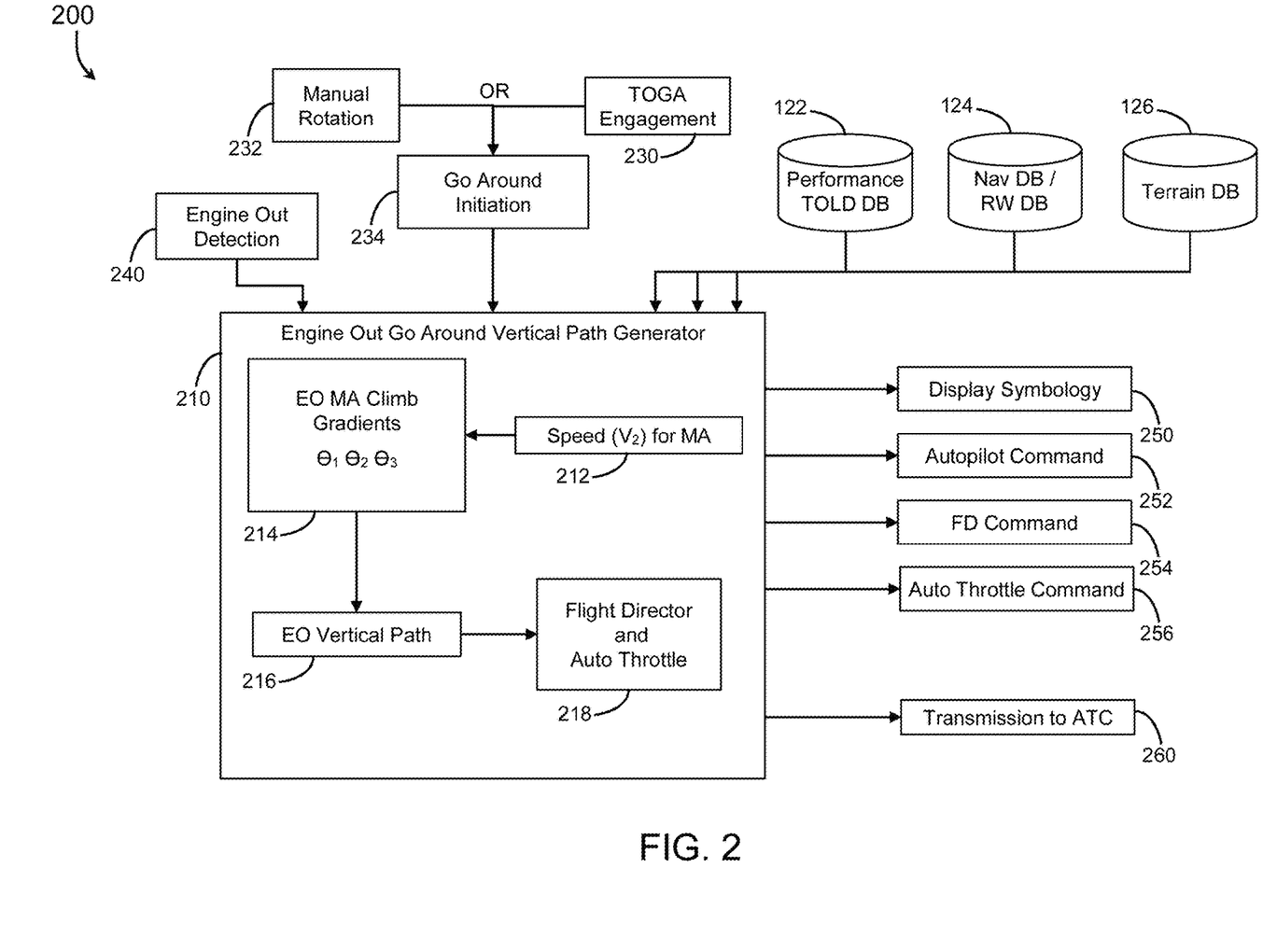
FIG. 2 is a diagram of a logic flow in accordance with an embodiment of the inventive concepts disclosed herein.

FIG. 2

Referring now to FIG. 2, a diagram of a logic flow in accordance with an embodiment of the inventive concepts disclosed herein is shown. A Logic Flow Diagram 200 may include an EOGA vertical path generator 210. Incorporated within the controller 110, the EOGA vertical path generator may include a speed generator 212, a climb gradients generator 214, an EO vertical path generator 216, and a flight director and auto thrust command generator 218. The performance DB 122, the navigation DB 124 and the terrain DB 126 may be available to the controller 110 for access to the stored data.

The performance DB 122 may include each performance aspect of the aircraft. Such exemplary performance characteristics may be stored for the aircraft at specific gross weights, density altitudes, and temperatures. Exemplary characteristics may include a rate of climb with one EO, a takeoff safety (V2) speed at various weights, and rotation rates at a specific vertical speed.

The navigation DB 124 may include a plurality of traditional variables included in a DB of flight environments. Specifically, the navigation DB 124 may include the current published instrument approach procedure being flown by the aircraft, the published MAP, the MAPt, the area bounded by the MAP 308, and the MAPt altitude.

The terrain DB 126 may include traditional information concerning terrain, obstacles, and threats to aircraft. Of interest here, the controller 110 may retrieve terrain data from the terrain DB 126 bounded by the area of the MAP 308.

To trigger the EO status and the GA status, a TOGA engagement 230, a manual rotation 232, a GA initiation 234, and an EO detection 240 may function to notify the controller 110 of the EO status and the GA status.

As outputs, the system for EO GA obstacle clearance 100 may produce a display symbology 250, an autopilot command 252, a flight director command 254, an autothrottle command 256, and a transmission external 260 to the aircraft.

FIG. 3

Referring now to FIG. 3, a diagram of a vertical path side view 300 exemplary of an embodiment of the inventive concepts disclosed herein is shown. The vertical diagram 300 may indicate a published MAPt 390 where an aircraft not in sight of the runway environment must execute a published MAP. The aircraft may be intending to land on a runway 384 having a runway elevation MSL 382.

A standard MA climb gradient 394 of 2.5% may be a statutory climb gradient for an aircraft to fly to remain clear of any obstacle within the MAP. However, should an aircraft be required to GA below the MAPt altitude, an unknown GA climb gradient 396 may cause uncertainty and lead to further safety of flight issues (e.g., low speed, stall, heading control loss). As discussed above, the GA below the MAPt altitude and an EO status as well may lead to further safety of flight challenges.

Here, the vertical diagram 300 may indicate an obstacle 1 302 and an obstacle 2 304 above which the system for EO GA obstacle clearance 100 may direct the aircraft. A final MAP elevation 306 may indicate an altitude of the terrain within the final segment of the published MAP.

The controller may function to generate a pseudo engine out go around procedure (PEOGAP) 310 which maintains clearance from each obstacle within the area bounded by the MAP 308. Here, the obstacle 1 302 and obstacle 2 304 may be exemplary obstacles within the area bounded by the MAP 308 wherein additional obstacles may be present and therefore, included within the PEOGAP 310.

In one embodiment of the inventive concepts disclosed herein, the PEOGAP 310 may comprise a plurality of segments and begin at a GA point A 320 where the controller 110 senses the GA and EO status, it may flow through a point B 322 above the obstacle 1 302, and a point C 324 above the obstacle 2 304, to an anticipation point (Ap) 326 where the PEOGAP 310 may vertically intersect a published vertical path of the MAP. Each of the points A through Ap may have a position and an associated altitude as determined by the controller 110 either before the GA status or at the time of the GA status. Here, point A 320 may have a GA point A position 340 and a GA point A altitude MSL 360. The point B 322 may include a point B position 342 and a point B altitude MSL 362, the point C 324 may include a point C position 344 and a point C altitude MSL 364, and the Ap 326 may include an Ap position 346 and an Ap altitude 366. Of note here, all altitudes are reference to sea level 380 in feet MSL.

In one embodiment of the inventive concepts disclosed herein, the controller 110 may apply a fixed clearance plus a safety margin to each obstacle to reach the point B and point C altitudes to ensure adequate clearance between the aircraft and each obstacle. In embodiments, the controller 110 may apply the fixed clearance of approximately 35 feet and the safety margin of approximately ten percent (10%) of the height MSL of each obstacle as retrieved from the terrain DB 126.

The controller 110 may function to determine a horizontal distance between each point including a distance A-B 350, a distance B-C 352, and a distance C-Ap 354. Also, an altitude difference between each point using simple math.

In one embodiment of the inventive concepts disclosed herein, the controller 110 may determine each angle or the PEOGAP 310 from point to point. A plurality of segments may be used in the PEOGAP 310 however, three segments may be exemplary to indicate controller 110 function. A theta 2 ($\Theta 2$) 330 may describe a first climb gradient from the GA point A 320 to the point B 322. A theta 1 ($\Theta 1$) 332 may describe a second segment climb gradient from the point B 322 to the point C 324 and a theta 3 ($\Theta 3$) 334 may indicate the controller 110 calculated climb gradient between the point C 324 and Ap 326.

Figure 4:
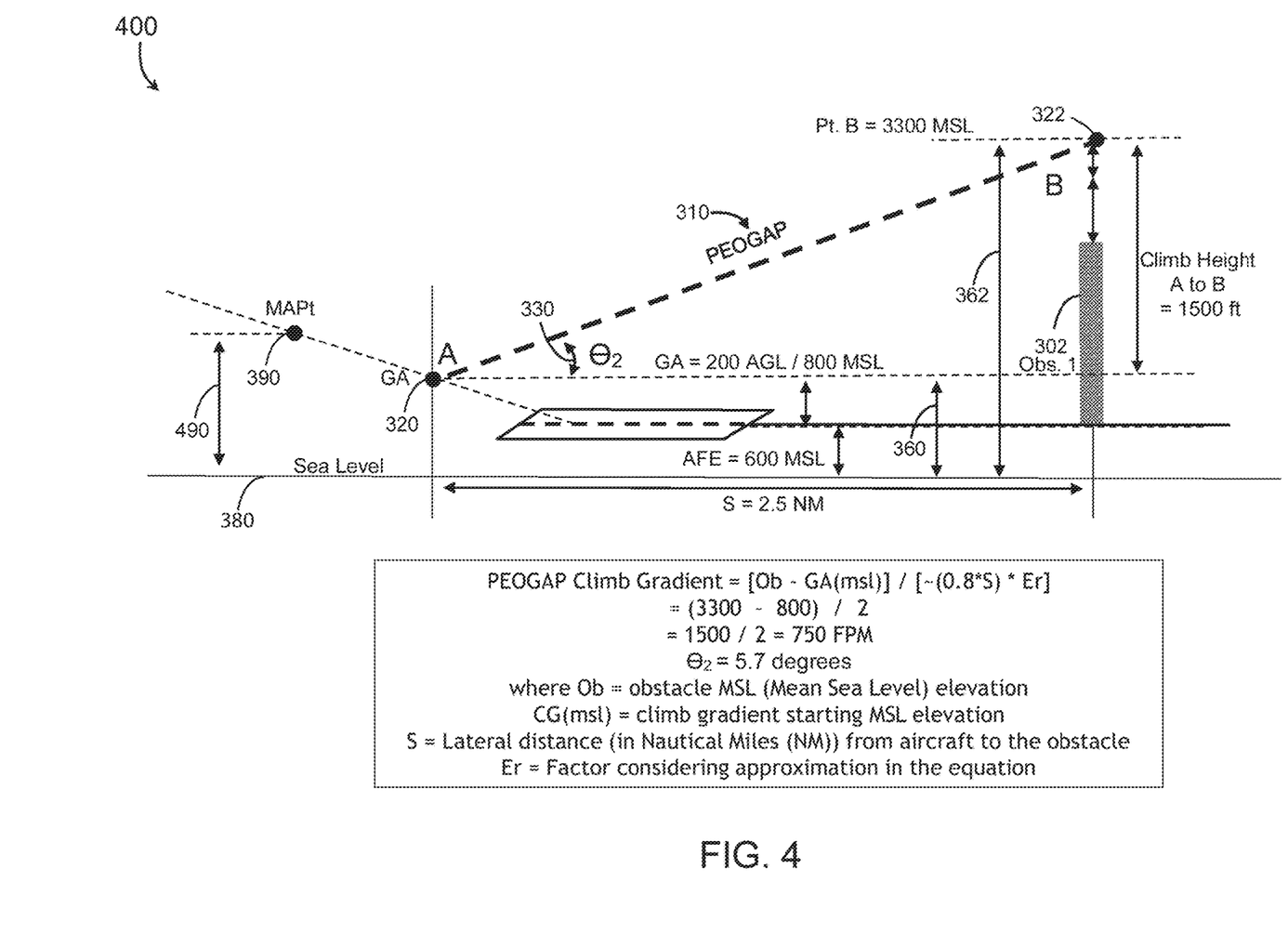
FIG. 4 is a diagram of a geometry presentation exemplary of one embodiment of the inventive concepts disclosed herein.

FIG. 4

Referring now to FIG. 4, a diagram of a geometry presentation exemplary of one embodiment of the inventive concepts disclosed herein is shown. In one embodiment of the inventive concepts disclosed herein, a geometry example 400 may indicate a first segment of the PEOGAP 310. Here, the MAPt altitude MSL 490 is indicated but may not be relevant since the inventive concepts disclosed herein center on altitudes below the MAPt altitude 490 ft MSL.

Here, an exemplary field elevation may be 600 feet MSL and the GA is executed at 200 ft AGL (800 ft MSL). An exemplary height of point B 322 may be 3300 ft MSL (obstacle 1 height (e.g., 2965)+35 ft+10%) leading to a climb height from the GA point A 320 to the point B 322 of 1500 ft. Using an inverse tangent function, the controller 110 may then determine the $\Theta 2$ 330 of 5.7 degrees requiring an exemplary climb rate of 750 FMP which is understandable to the pilot and FCC. The controller 110 may employ exemplary functions as follows:

$$\Theta = \tan{-1}[MVCR/DMAS] \qquad [F.1]$$

wherein
MVCR—minimum vertical clearance required
DMAS—distance in missed approach segment $$[\Theta 1]PEOGAP = F[(\Theta 2)_{(ob1)}, (\Theta 1)_{(ob2)}, (\Theta 3)_{(Ap)}] \qquad [F.2]$$

wherein
($\Theta 1$) (ob2)=climb gradient required w.r.t obstacle 2 (ob2) 304
($\Theta 2$) (ob1)=climb gradient required w.r.t obstacle 1 (ob1) 302
($\Theta 3$) (Ap)=climb gradient required w.r.t Ap 326

$$PEOGAP\ Climb\ Gradient = [Ob - GA(msl)]/[\sim(0.8 * S) * Er] \qquad [F.3]$$

Wherein
Ob=obstacle MSL (Mean Sea Level) elevation
CG(msl)=climb gradient starting MSL elevation S=Lateral distance (in Nautical Miles (NM)) from aircraft to the obstacle Er=Factor considering approximation in the equation In one embodiment of the inventive concepts disclosed herein, the controller 110 may receive, from either the GA selection monitor 130 or the aircraft state monitor 132, a GA status of the aircraft. In declaring the GA status, the controller 110 may function to create the PEOGAP 310 for the aircraft to safely fly the EO GA path. In additional embodiments, the controller 110 may continuously calculate the PEOGAP 310 in anticipation of the GA status and EO status and store the PEOGAP within the memory 120 before the reception of the GA and EO status of the aircraft.

The controller may receive, from the engine status monitor 140, the EO status of one of the aircraft engines and retrieve, from the aircraft state monitor 140, 1) a GA altitude 360 MSL of the aircraft at the GA status. Here, the GA altitude 360 may be defined as being below the MAPt altitude 490. The controller 110 may also retrieve 2) a GA point A 320 associated with the GA status.

The controller 110 may retrieve, from the terrain DB 126, at least one obstacle within an area bound by the MAP 308. Here, each obstacle within the area 308 bound by the MAP 392 may be a threat to the aircraft climbing out on a single engine or a loss of an engine. The controller 110 may retrieve, from the performance DB 122, an aircraft performance data associated with the aircraft including a takeoff safety (V2) speed of the aircraft, at the time of the GA status.

In one embodiment of the inventive concepts disclosed herein, with this data, the controller 110 may generate the PEOGAP 310 for the aircraft based on the aircraft performance data at the V2 speed. The PEOGAP 310 may include a first vertical path from the GA point A 320 at the GA altitude 360 to a first obstacle clearance point B 322, the first obstacle clearance point a first height MSL 362 of a first obstacle 302 plus the fixed clearance plus the safety margin.

The PEOGAP 310 may also include a second vertical path from the first obstacle clearance point B 322 to the second obstacle clearance point C 324, the second obstacle clearance point 324 a second height MSL 364 of a second obstacle 304 plus the fixed clearance plus the safety margin. The PEOGAP 310 may further include a third vertical path from the second obstacle clearance point C 324 to the anticipation point 326, the Ap 326 having an anticipation altitude 366 which intersects a vertical path within a final portion of the published MAP 392.

The controller 110 may function to display the PEOGAP 310 to the pilot on the flight deck display 150. As discussed above, the flight deck display may be located remotely from the aircraft where the pilot may remotely operate the aircraft. Here, the autopilot 152 may function to command the aircraft to fly the PEOGAP 310 or a flight path above the PEOGAP 310 to the Ap 326.

In embodiments, the PEOGAP 310 may be generated based on the V2 speed climb performance. The aircraft may maintain minimum V2 speed until reaching the Ap 326 where, clear of all obstacles and within the final segment of the published MAP 392, the aircraft may change speed to an engine out speed, a GA speed, or engine out climb speed.

Figure 5:
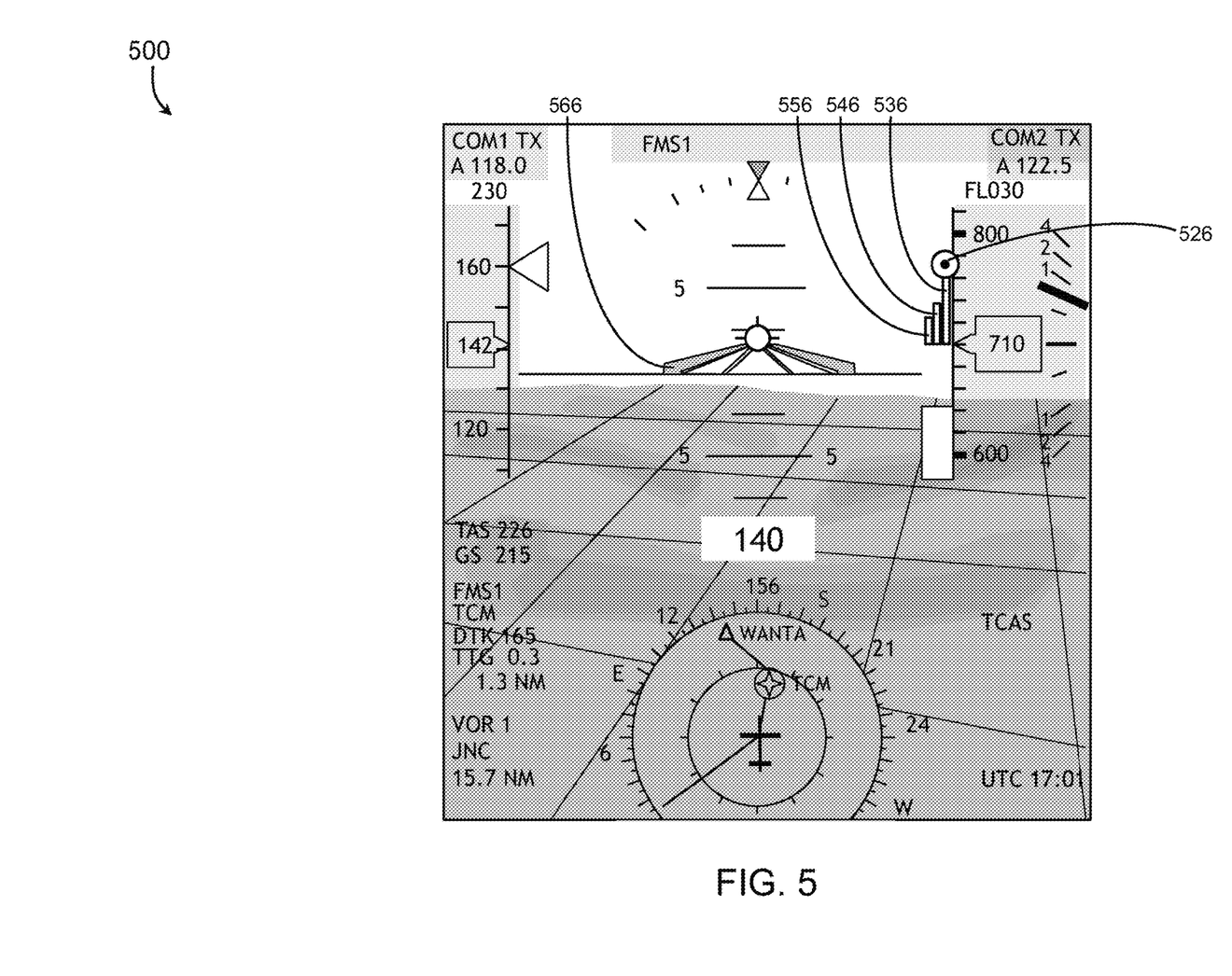
FIG. 5 is a diagram of a multi-function display in accordance with one embodiment of the inventive concepts disclosed herein.

FIG. 5

Referring to FIG. 5, a diagram of a multi-function display in accordance with one embodiment of the inventive concepts disclosed herein is shown. A multi-function display (MFD) diagram 500 may indicate one exemplary implementation of a pilot display of the PEOGAP 310. Here, the controller 110 may present an Ap symbology 526 associated with a Red Bar 536 indicating a Negative Performance, a Yellow Bar 546 indicating Neutral Performance, and a Green Bar 556 indicating a Positive Performance relative to the PEOGAP 310. For example, should the aircraft be below the PEOGAP 310, the controller 110 may present the red bar 536 to indicate to the pilot an increase in performance is required to remain clear of the upcoming obstacle.

In embodiments, a size of the colored status bar may further indicate a magnitude of displacement from the PEOGAP 310. Here, a vertical size of the colored status bar may include a short vertical size indicating positive performance and a long vertical size indicated negative performance, each performance relative to the PEOGAP 310. For example, a short vertical yellow may indicate a slight negative deviation or a slight negative performance while a long vertical yellow may indicate a greater negative deviation.

A flight director 154 with command bars 566 may also function within the scope of the incentive concepts herein to display performance data to the pilot. Here, a negative performance may be indicated by command bars 566 above an aircraft diamond symbol while a positive performance may be indicated by the command bars 566 below the aircraft diamond symbol.

Figure 6:
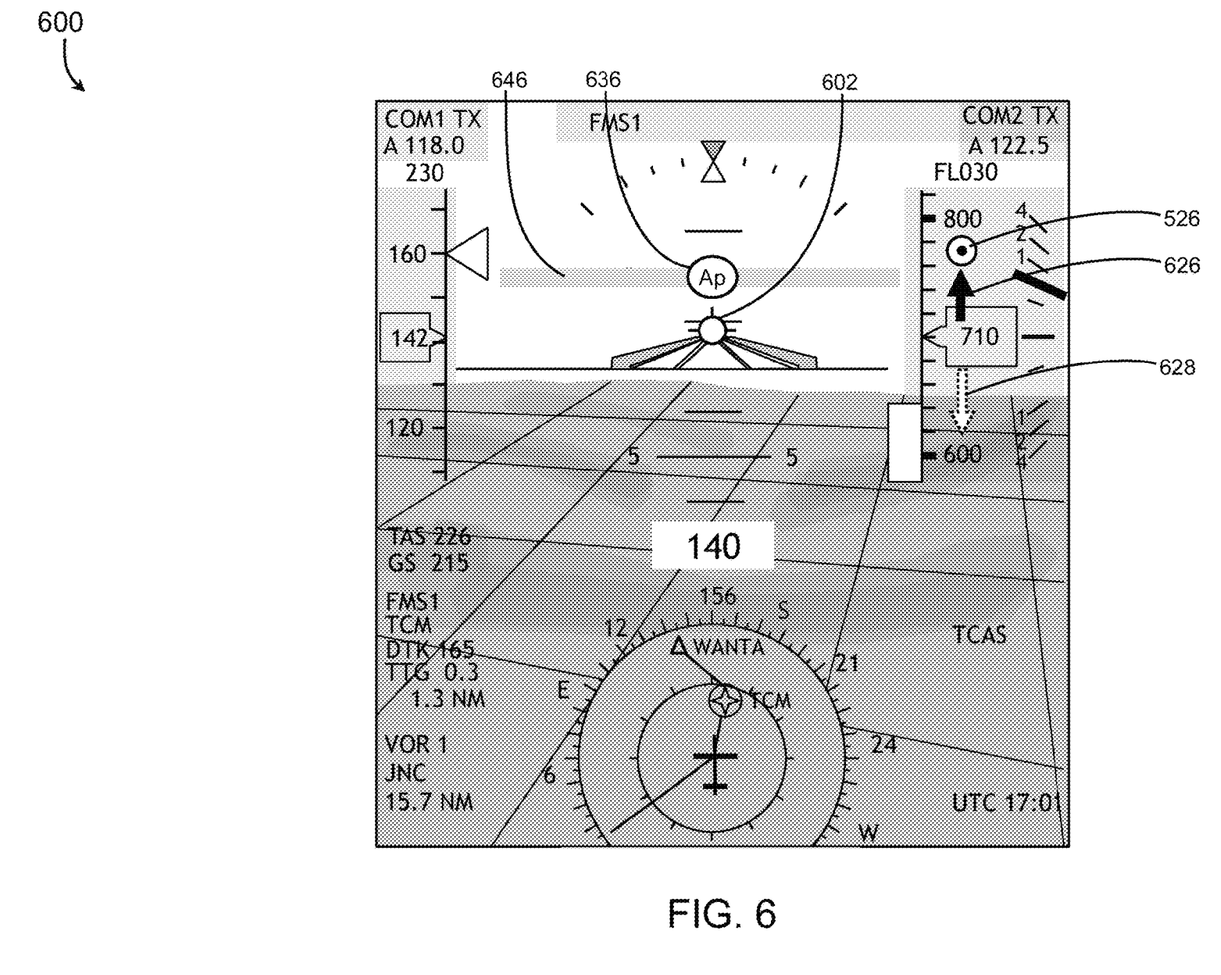
FIG. 6 is a diagram of a multi-function display trend in accordance with one embodiment of the inventive concepts disclosed herein.

FIG. 6

Referring now to FIG. 6, a diagram of a multi-function display trend in accordance with one embodiment of the inventive concepts disclosed herein is shown. An MFD trend arrow display 600 may indicate a trend arrow 626 with which some pilots may be familiar. A short trend arrow 626 may indicate a lesser performance while a negative trend arrow 628 pointing below the altitude field (e.g., 710 ft MSL) may indicate a negative performance. A long positive trend arrow 626 may be a graphical representation of the next point along the PEOGAP 310, and a trend arrow indicating a climb performance relative to the PEOGAP 310.

In addition, in the center of the display where a pilot may focus, a guidance Ap circle 636, displayed in association with a guidance bar 646 may indicate to the pilot an angular representation of where the pilot may need to place a flight path marker 602 to achieve the desired flight path and intersect the Ap 326.

Figure 7:
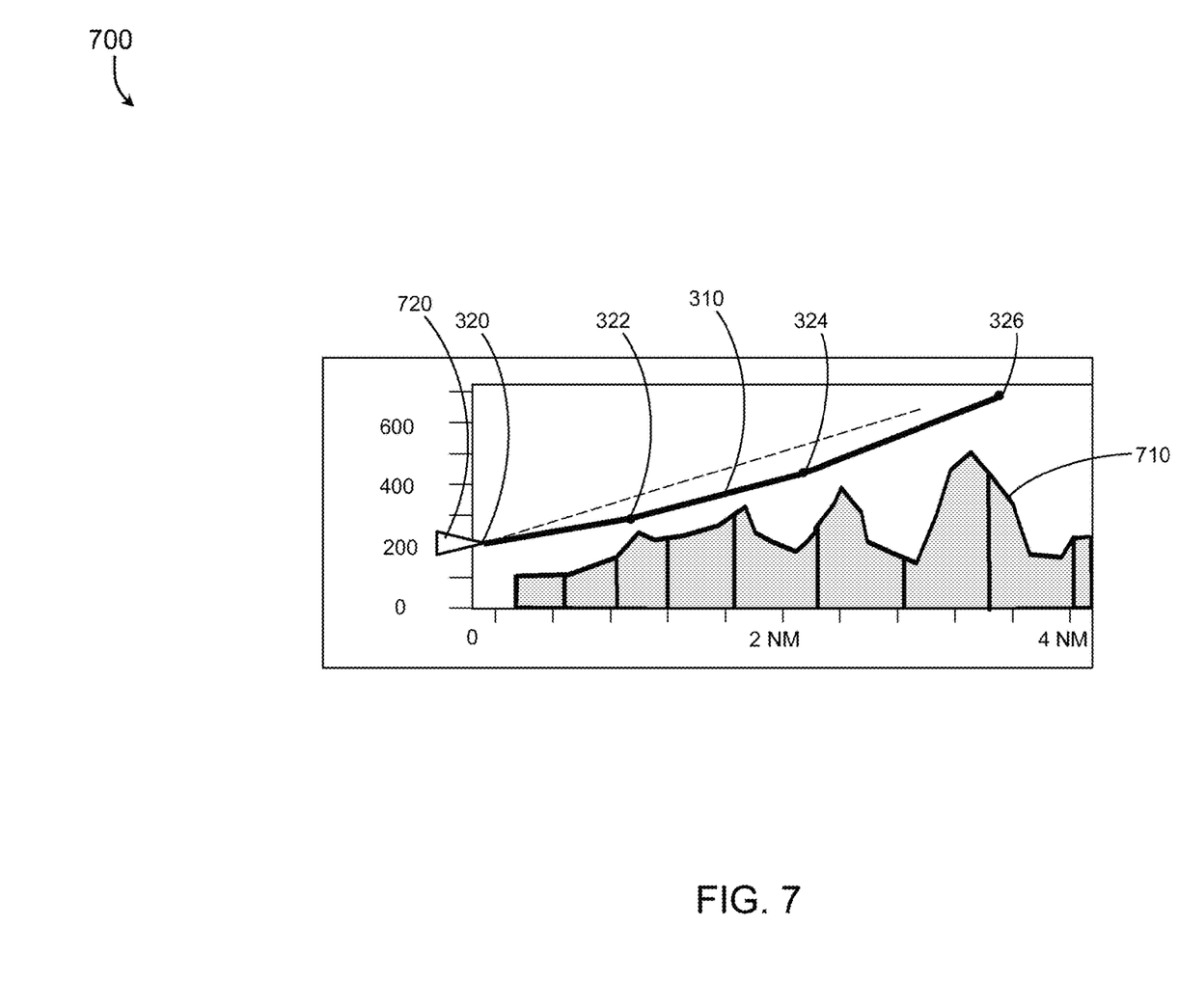
FIG. 7 is a diagram of a vertical situation display in accordance with one embodiment of the inventive concepts disclosed herein.

FIG. 7

Referring to FIG. 7, a diagram of a vertical situation display in accordance with one embodiment of the inventive concepts disclosed herein is shown. A vertical situation display (VSD) 700 may be familiar to some pilots indicating a terrain 710 as well as an aircraft symbol 720 relative to the PEOGAP 310 display.

In embodiments, additional types of flight deck display 150 may function within the scope of the inventive concepts disclosed herein. A traffic collision avoidance system (TCAS) display may function to display positive, neutral, and negative trend data including colors red, yellow, and green as pilots may be familiar with a vertical clearance requirement associated with the TCAS display.

Figure 8:
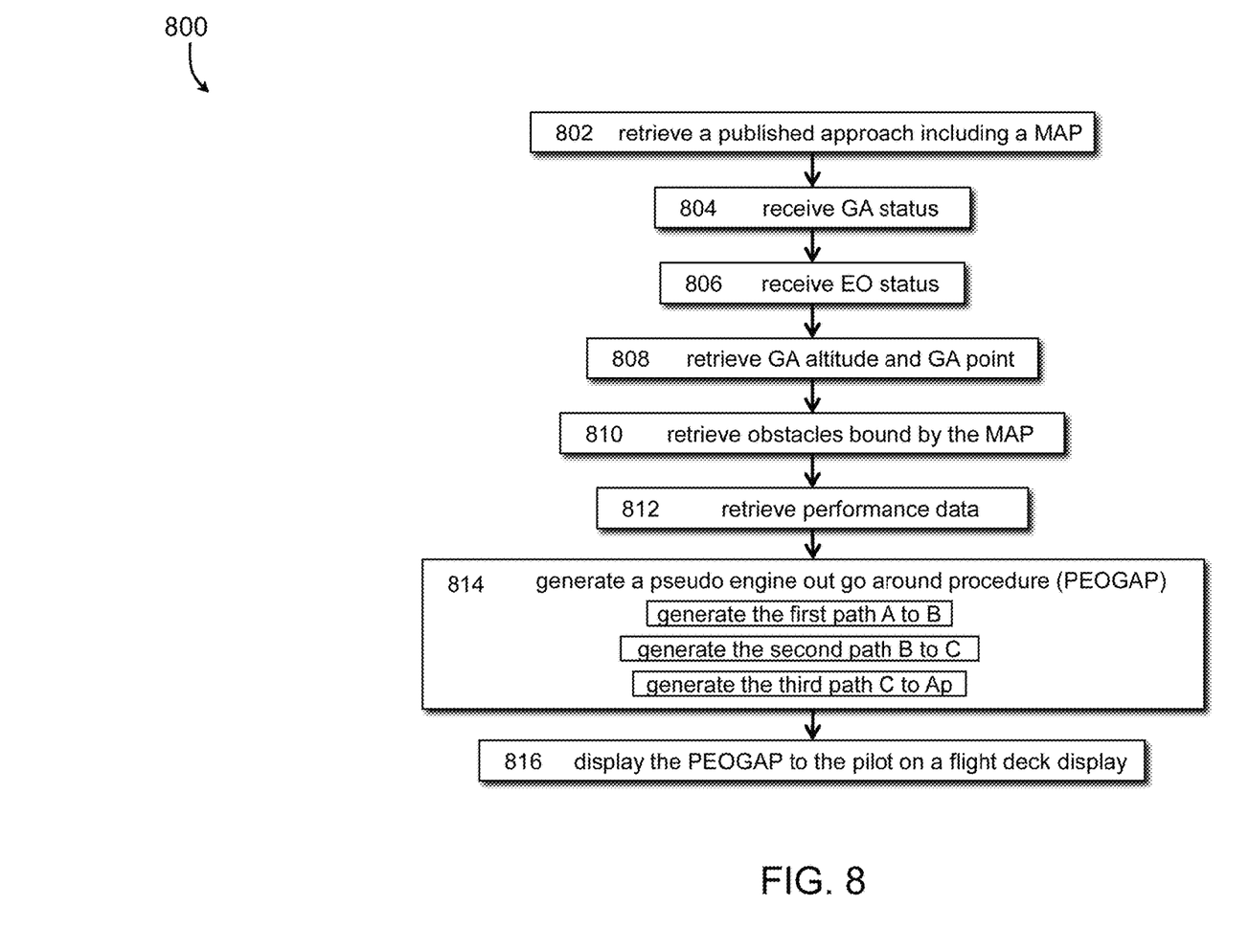
FIG. 8 is a diagram of an exemplary method flow in accordance with one embodiment of the inventive concepts disclosed herein.

FIG. 8

Referring now to FIG. 8, a diagram of an exemplary method flow in accordance with one embodiment of the inventive concepts disclosed herein is shown. A method flow 800 may include, at a step 802, retrieving, from the navigation database (DB), the published approach flown by the aircraft, the published approach including the published missed approach point (MAPt), the MAPt altitude mean sea level (MSL), and the published missed approach procedure (MAP), and, at a step 804, receiving, from the GA selection monitor or an aircraft state monitor, the GA status of the aircraft.

The method may include, at a step 806, receiving, from the engine status monitor, an EO status of the engine coupled with the aircraft, and, at a step 808, retrieving, from the aircraft state monitor, 1) the GA altitude MSL of the aircraft at the GA status, the GA altitude defined as being below the MAPt altitude and 2) the GA point associated with the GA status.

The method may include, at a step 810, retrieving, from the terrain DB, an obstacle within the area bound by the MAP, and, at a step 812, retrieving, from the performance DB, the aircraft performance data associated with the aircraft including the takeoff safety (V2) speed of the aircraft, at the GA status.

The method may include, at a step 814, generating the pseudo engine out go around procedure (PEOGAP) for the aircraft based on the aircraft performance data at the V2 speed, the PEOGAP including the first vertical path from the GA point at the GA altitude to a first obstacle clearance point, the first obstacle clearance point having a first height MSL of the first obstacle of the at least one obstacle plus a fixed clearance plus a safety margin, the second vertical path from the first obstacle clearance point to the second obstacle clearance point, the second obstacle clearance point having the second height MSL of the second obstacle of the at least one obstacle plus the fixed clearance plus the safety margin; and the third vertical path from the second obstacle clearance point to the Ap, the Ap having an anticipation altitude which intersects the vertical path within the final portion of the published MAP. The method may include, at a step 816, displaying the PEOGAP to the pilot on a flight deck display.

CONCLUSION

As will be appreciated from the above description, embodiments of the inventive concepts disclosed herein may provide a novel solution to establish a minimum climb gradient requirement to remain clear of all obstacles during an EO GA.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:
1. A system onboard an aircraft for engine out (EO) go around (GA) obstacle clearance, comprising:
a GA selection monitor configured for sensing a pilot section of a GA;
an aircraft state monitor configured for monitoring at least one aircraft state;
an engine status monitor configured to monitor an engine operating status or an EO status of at least one engine coupled with the aircraft;
a flight deck display available to a pilot;
a controller operatively coupled with each of the GA selection monitor, the aircraft state monitor, the engine status monitor, and the flight deck display;
a tangible, non-transitory memory configured to communicate with the controller, the tangible, non-transitory memory including a performance database (DB), a navigation DB, and a terrain DB, the tangible, non-transitory memory having instructions stored therein that, in response to execution by the controller, cause the controller to:
retrieve, from the navigation DB, a published approach flown by the aircraft, the published approach including a published missed approach point (MAPt), a MAPt altitude mean sea level (MSL), and a published missed approach procedure (MAP);
receive, from one of: the GA selection monitor or the aircraft state monitor, a GA status of the aircraft;
receive, from the engine status monitor, the EO status of the at least one engine;
retrieve, from the aircraft state monitor, 1) a GA altitude MSL of the aircraft at the GA status, the GA altitude defined as being below the MAPt altitude and 2) a GA point associated with the GA status;
retrieve, from the terrain DB, at least one obstacle within an area bound by the MAP;
retrieve, from the performance DB, an aircraft performance data associated with the aircraft including a takeoff safety (V2) speed of the aircraft, at the GA status;
generate a pseudo engine out go around procedure (PEOGAP) for the aircraft based on the aircraft performance data at the V2 speed, the PEOGAP configured to maintain clearance from each obstacle within the area bound by the MAP, the PEOGAP including:
a first vertical path having a first climb gradient from the GA point at the GA altitude to a first obstacle clearance point, the first obstacle clearance point a first height MSL of a first obstacle of the at least one obstacle plus a fixed clearance plus a safety margin;
a second vertical path having a second climb gradient from the first obstacle clearance point to a second obstacle clearance point, the second obstacle clearance point a second height MSL of a second obstacle of the at least one obstacle plus the fixed clearance plus the safety margin; and
a third vertical path having a third climb gradient from the second obstacle clearance point to an anticipation point, the anticipation point having an anticipation altitude which intersects a vertical path within a final portion of the published MAP; and display the PEOGAP to the pilot on the flight deck display; and an autopilot system, a flight director, and an auto throttle system coupled to the controller and configured to receive the EO status and the GA status and command the aircraft to fly one of: the PEOGAP or above the PEOGAP to the anticipation point.

2. The system for EO GA obstacle clearance of claim 1, further including a datalink configured to communicate the EO status and the GA status to an air traffic control.

3. The system for EO GA obstacle clearance of claim 1, wherein the fixed clearance is approximately 35 feet and the safety margin is approximately ten percent (10%) of an obstacle height plus the fixed clearance.

4. The system for EO GA obstacle clearance of claim 1, wherein the GA selection monitor further comprises one of a thrust lever sensor, a GA push button sensor, a takeoff go around (TOGA) sensor, and a flight management system (FMS) interface.

5. The system for EO GA obstacle clearance of claim 1, wherein the at least one aircraft state further comprises a position, an altitude MSL, an altitude above ground level (AGL), a rate of climb, a rate of descent, an airspeed, a groundspeed, an attitude, a power level of the at least one engine, and a heading.

6. The system for EO GA obstacle clearance of claim 1, wherein the engine status monitor further comprises one of: an engine speed monitor, an engine fuel flow monitor, and an engine condition and monitoring (ECAM) interface.

7. The system for EO GA obstacle clearance of claim 1, wherein the flight deck display further comprises one of: a multifunction display (MFD), a heads up display (HUD), and a helmet mounted display (HMD).

8. The system for EO GA obstacle clearance of claim 1, wherein display the PEOGAP to the pilot on the flight deck display further comprises one of: at least one colored status bar, a graphical representation of the anticipation point, and a trend arrow indicating a climb performance relative to the PEOGAP.

9. The system for EO GA obstacle clearance of claim 8, wherein the colored status bar further comprises a red status bar indicating a negative performance, a yellow status bar indicating a neutral performance, and a green status bar indicating a positive performance, each performance relative to the PEOGAP.

10. The system for EO GA obstacle clearance of claim 8, wherein a vertical size of the colored status bar indicates performance, a short vertical size indicates positive performance and a long vertical size indicated negative performance, each performance relative to the PEOGAP.

11. The system for EO GA obstacle clearance of claim 1, wherein display the PEOGAP to the pilot on the flight deck display further comprises a vertical situation display indicating a current MSL altitude of the aircraft and a terrain associated with the MAP.

12. The system for EO GA obstacle clearance of claim 1, wherein the controller is further configured to continuously calculate the PEOGAP and store the PEOGAP within the memory before the reception of the GA status and the EO status of the aircraft.

13. A method for engine out (EO) go around (GA) obstacle clearance, comprising:

retrieving, from a navigation database (DB), a published approach flown by an aircraft, the published approach including a published missed approach point (MAPt), a MAPt altitude mean sea level (MSL), and a published missed approach procedure (MAP);

receiving, from one of: a GA selection monitor or an aircraft state monitor, a GA status of the aircraft;

receiving, from an engine status monitor, an EO status of at least one engine coupled with the aircraft;

retrieving, from the aircraft state monitor, 1) a GA altitude MSL of the aircraft at the GA status, the GA altitude defined as being below the MAPt altitude and 2) a GA point associated with the GA status;

retrieving, from a terrain DB, at least one obstacle within an area bound by the MAP;

retrieving, from a performance DB, an aircraft performance data associated with the aircraft including a takeoff safety (V2) speed of the aircraft, at the GA status;

generating a pseudo engine out go around procedure (PEOGAP) for the aircraft based on the aircraft performance data at the V2 speed, the PEOGAP configured to maintain clearance from each obstacle within the area bound by the MAP, the PEOGAP including:

a first vertical path having a first climb gradient from the GA point at the GA altitude to a first obstacle clearance point, the first obstacle clearance point having a first height MSL of a first obstacle of the at least one obstacle plus a fixed clearance plus a safety margin;

a second vertical path having a second climb gradient from the first obstacle clearance point to a second obstacle clearance point, the second obstacle clearance point having a second height MSL of a second obstacle of the at least one obstacle plus the fixed clearance plus the safety margin; and a third vertical path having a third climb gradient from the second obstacle clearance point to an anticipation point, the anticipation point having an anticipation altitude which intersects a vertical path within a final portion of the published MAP;

displaying the PEOGAP to a pilot on a flight deck display;

command the aircraft to fly one of: the PEOGAP or above the PEOGAP to the anticipation point, wherein the commanding is performed via an autopilot system, a flight director, and an auto throttle system coupler to a controller and configured to receive the EO status and the GA status.

14. The method for EO GA obstacle clearance of claim 13, wherein display the PEOGAP to the pilot on the flight deck display further comprises one of: a vertical situation presentation, a colored presentation based on performance relative to the PEOGAP, and a graphical presentation based on performance relative to the PEOGAP.

* * * * *